(12) United States Patent
Inoue et al.

(10) Patent No.: US 6,935,417 B1
(45) Date of Patent: Aug. 30, 2005

(54) SOLUTION HEAT EXCHANGER FOR ABSORPTION REFRIGERATING MACHINE

(75) Inventors: Naoyuki Inoue, Tokyo (JP); Toshio Matsubara, Tokyo (JP); Shouji Tanaka, Tokyo (JP); Akiyoshi Suzuki, Tokyo (JP); Hiroki Nakamura, Tokyo (JP); Tomoyuki Uchimura, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/806,520

(22) PCT Filed: Oct. 19, 1999

(86) PCT No.: PCT/JP99/05763

§ 371 (c)(1),
(2), (4) Date: Apr. 18, 2001

(87) PCT Pub. No.: WO00/23754

PCT Pub. Date: Apr. 27, 2000

(30) Foreign Application Priority Data

Oct. 19, 1998 (JP) .......................................... 10-296317
Mar. 30, 1999 (JP) ............................................ 11-88418

(51) Int. Cl.$^7$ ................................................. F28F 3/08
(52) U.S. Cl. ...................... 165/167; 165/144; 165/166; 165/112; 165/111; 165/110
(58) Field of Search ................................ 165/144, 110, 165/111, 112, 166

(56) References Cited

U.S. PATENT DOCUMENTS

| | | | | |
|---|---|---|---|---|
| 1,894,760 A | * | 1/1933 | Dodd .......................... | 165/110 |
| 2,183,956 A | * | 12/1939 | Campbell et al. ........... | 165/110 |
| 3,559,722 A | * | 2/1971 | Schauls et al. .............. | 165/166 |
| 4,098,328 A | * | 7/1978 | Cheong ....................... | 165/72 |
| 4,116,268 A | * | 9/1978 | Kruger ........................ | 165/111 |
| 4,147,209 A | * | 4/1979 | Persson ....................... | 165/161 |
| 4,249,595 A | * | 2/1981 | Butt ............................ | 165/110 |
| 4,260,015 A | * | 4/1981 | Tamburini ................... | 165/110 |
| 4,579,163 A | * | 4/1986 | Maendel ....................... | 165/54 |
| 4,844,151 A | * | 7/1989 | Cohen .......................... | 165/44 |
| 4,966,231 A | * | 10/1990 | Belcher et al. .............. | 165/166 |
| 5,362,454 A | * | 11/1994 | Cizmer et al. ............... | 422/201 |
| 5,462,113 A | * | 10/1995 | Wand ........................... | 165/167 |
| 5,511,612 A | * | 4/1996 | Tajima et al. ............... | 165/167 |
| 5,513,702 A | * | 5/1996 | Tajima et al. ............... | 165/167 |
| 5,558,154 A | * | 9/1996 | Lefeber ........................ | 165/51 |
| 5,787,975 A | * | 8/1998 | Grenier et al. .............. | 165/166 |
| 5,810,071 A | * | 9/1998 | Pavlin ......................... | 165/284 |
| 5,823,247 A | * | 10/1998 | Weibler ....................... | 165/76 |
| 5,950,715 A | * | 9/1999 | Jonsson et al. .............. | 165/103 |
| 6,026,894 A | * | 2/2000 | Bachinger ................... | 165/166 |
| 6,142,221 A | * | 11/2000 | Johansson ................... | 165/140 |
| 6,142,222 A | * | 11/2000 | Kang et al. .................. | 165/148 |
| 6,161,615 A | * | 12/2000 | Brieden et al. .............. | 165/166 |

FOREIGN PATENT DOCUMENTS

| | | | |
|---|---|---|---|
| JP | 63-116066 | | 5/1988 |
| JP | 63-90765 | | 6/1988 |
| JP | 3-91695 | | 4/1991 |
| JP | 03-091695 | | 4/1991 |
| JP | 7-190651 | | 7/1995 |
| JP | 9-96459 | | 4/1997 |
| JP | 09-096459 | | 4/1997 |
| JP | 09096459 | * | 4/1997 ........... F25B/15/00 |

* cited by examiner

*Primary Examiner*—Henry Bennett
*Assistant Examiner*—Nihir Patel
(74) *Attorney, Agent, or Firm*—Westerman, Hattori, Daniels & Adrian, LLP

(57) ABSTRACT

The present invention relates to a solution heat exchanger used for performing heat exchange between a dilute solution and a concentrated solution in a solution passage of an absorption refrigerating machine. The solution heat exchanger (H) comprises a plate type heat exchanger, and a communication portion (R) communicating between a dilute solution passage and a concentrated solution passage for introducing a portion of a dilute solution into a concentrated solution is provided in the solution heat exchanger (H).

6 Claims, 12 Drawing Sheets

SOLUTION HEAT EXCHANGER FOR ABSORPTION REFRIGERATING MACHINE

TECHNICAL FIELD

The present invention relates to a heat exchanger, and more particularly to a plate type heat exchanger used for performing heat exchange between a dilute solution and a concentrated solution in a solution passage of an absorption refrigerating machine.

BACKGROUND ART

An absorption refrigerating machine has heretofore suffered a drawback in that an absorption solution used as working medium is crystallized when its concentration becomes high and its temperature becomes low. Therefore, an absorption refrigerating machine is designed with a margin for a crystallization line.

Generally, in the absorption refrigerating machine, a region in which the absorption solution has a high concentration and a low temperature is an outlet for a concentrated solution in a solution heat exchanger. In order to increase the efficiency of the absorption refrigerating machine, it is necessary to lower the temperature of the concentrated solution at this outlet. Therefore, when the efficiency of the absorption refrigerating machine is increased, the temperature of the concentrated solution at the outlet in the solution heat exchanger is lowered, resulting in the crystallization.

Particularly, since a plate type heat exchanger has a good performance of heat transfer and is compact, it is relatively easy to increase the heat transfer area thereof. Thus, it is important to take measures to prevent crystals from being formed when the efficiency of the plate type heat exchanger is increased.

Heretofore, a multitubular (baffle-type) heat exchanger has mainly been used as the solution heat exchanger for the absorption refrigerating machine. Depending on the absorption cycle, a plurality of heat exchangers, as component devices, including a low-temperature solution heat exchanger, a high-temperature solution heat exchanger, an exhaust-heat-recovery heat exchanger, and the like are combined with each other.

These solution heat exchangers are arranged as independent heat exchangers and connected to each other through pipes for performing desired functions.

Since the multitubular heat exchanger is used as the solution heat exchanger, and the solution heat exchangers installed independently of each other are connected to each other through pipes, the solution heat exchanger has the following drawbacks:

① The amount of the solution in the heat exchangers and the pipes is large, and the start-up characteristics are poor.

② Since the solution heat exchanger is large in size and heavy, a reduction in size and weight is difficult to be carried out and is costly.

③ The solution heat exchanger has complicated piping and requires a long time to be manufactured.

④ The solution heat exchanger has a structure that cannot easily be mass-produced.

Even if these solution heat exchangers are constituted by plate type heat exchangers, the solution heat exchangers installed independently of each other need to be connected to each other through external pipes. Therefore, the piping of the heat exchangers becomes complicated and costly. Further, the space occupied by the heat exchangers cannot be reduced.

Since the plate type heat exchanger tends to have a pressure loss larger than the multitubular heat exchanger, the plate type heat exchanger is required to have a structure that minimizes the pressure loss caused by the external pipes in order to maximize the heat transfer effect within a limited range of allowable pressure losses in absorption refrigerating cycles.

DISCLOSURE OF INVENTION

The present invention has been made in view of the above drawbacks. It is therefore a first object of the present invention to provide a solution heat exchanger for an absorption refrigerating machine, which comprises a plate type heat exchanger and can stably be operated without crystallization even when the efficiency of the absorption refrigerating machine is greatly improved.

It is a second object of the present invention to provide a plate type heat exchanger which can be mass-produced at low cost with reduced size and weight, and can easily be changed in passage structure, and has a minimized pressure loss, and to provide a solution heat exchanger for an absorption refrigerating machine, which employs such a plate type heat exchanger.

To achieve the first object, according to a first aspect of the present invention, there is provided a solution heat exchanger used for performing heat exchange between a dilute solution and a concentrated solution in a solution passage of an absorption refrigerating machine, characterized in that: the solution heat exchanger comprises a plate type heat exchanger; and a communication portion communicating between a dilute solution passage and a concentrated solution passage for introducing a portion of a dilute solution into a concentrated solution is provided in the solution heat exchanger.

In the above solution heat exchanger, it is desirable that the communication portion on the concentrated solution passage is located upstream of a final stage of the concentrated solution passage. The communication portion may be disposed between adjacent plates in the plate type heat exchanger.

To achieve the second object, according to a second aspect of the present invention, there is provided a plate type heat exchanger characterized in that: the plate type heat exchanger has an integral structure divided into a plurality of units by a partition wall; at least one of a plurality of the divided units has an inlet and an outlet for a fluid; and each of the units has a plurality of different heating and heated passages formed therein.

In the above plate type heat exchanger, at least one of the partition walls for dividing the plate type heat exchanger into a plurality of the units may have a passage communicating between the units disposed on both sides of the partition wall. The passage communicating between the units may be connected to the inlet or the outlet for the fluid.

Further, according to another aspect of the present invention, there is provided a solution heat exchanger for an absorption refrigerating machine for performing heat exchange between a concentrated solution and a dilute solution in the absorption refrigerating machine, characterized by comprising the above plate type heat exchanger. There is also provided a solution heat exchanger for an absorption refrigerating machine for performing heat exchange between a concentrated solution and exhaust heat, and a dilute solution in the absorption refrigerating machine, characterized by comprising the above plate type heat exchanger.

The absorption refrigerating machine may comprise a multiple effect absorption refrigerating machine in which the concentrated solution and/or the dilute solution flow through a plurality of passages, respectively.

BRIEF DESCRIPTION OF DRAWINGS

FIGS. 1A, 1B, and 1C are schematic views showing an example of a whole structure of a solution heat exchanger according to a first embodiment of the present invention.

FIGS. 2A, 2B, and 2C are schematic views showing another example of a whole structure of a solution heat exchanger according to the first embodiment of the present invention.

FIGS. 6A and 6B are schematic views showing a typical cross-sectional structure of the plate type heat exchanger shown in FIG. 5.

FIGS. 7A, 7B, and 7C are schematic views showing an example of a whole structure of a plate type heat exchanger according to a second embodiment of the present invention.

FIGS. 8A, 8B, and 8C are schematic views showing another example of a whole structure of a plate type heat exchanger according to the second embodiment of the present invention.

FIGS. 9A, 9B, and 9C are schematic views showing still another example of a whole structure of a plate type heat exchanger according to the second embodiment of the present invention.

BEST MODE FOR CARRYING OUT THE INVENTION

A first embodiment of the present invention will be described below with reference to FIGS. 1 through 6.

Figure 1A:
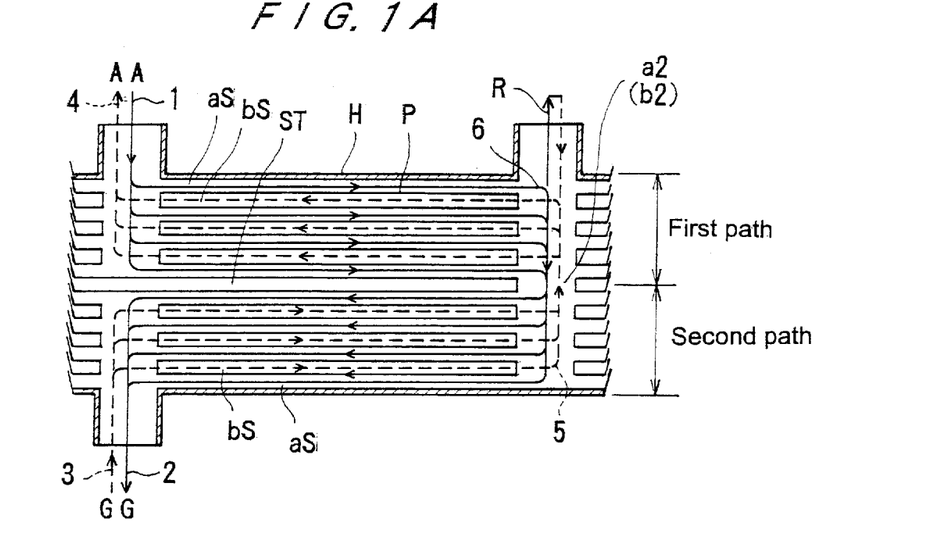
FIG. 1A is a cross-sectional front view of the solution heat exchanger.
Figure 1B:
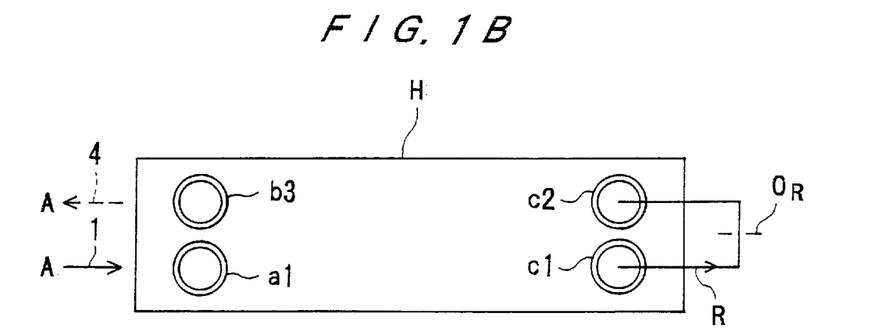
FIG. 1B is a plan view of the solution heat exchanger as viewed from above in FIG. 1A.
Figure 1C:
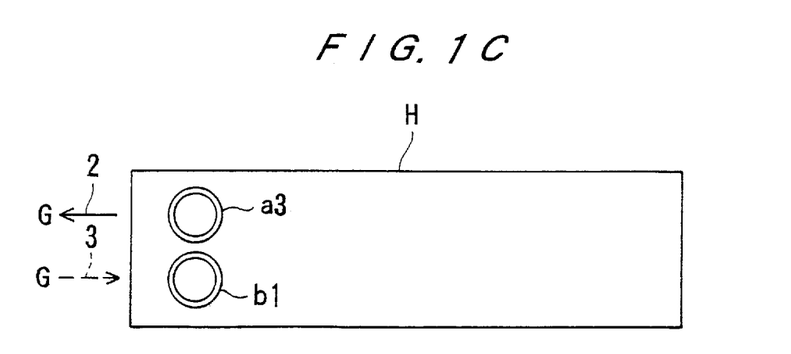
FIG. 1C is a plan view of the solution heat exchanger as viewed from below in FIG. 1A.

FIGS. 1A, 1B, and 1C are schematic views showing an example of a whole structure of a solution heat exchanger according to a first embodiment of the present invention. FIG. 1A is a cross-sectional front view of the solution heat exchanger, FIG. 1B is a plan view of the solution heat exchanger as viewed from above in FIG. 1A, and FIG. 1C is a plan view of the solution heat exchanger as viewed from below in FIG. 1A.

In FIGS. 1A through 1C, the reference character H denotes a solution heat exchanger, ST, a partition plate, and P, a plate. As indicated by the solid lines, a first, or dilute, solution 1 from an absorber A is introduced into the solution heat exchanger from a dilute solution inlet nozzle a1, and passed through inter-plate passages aS in a first path and an opening a2 formed in the partition plate ST. Then, the dilute solution 1 is passed through passages aS in a second path in an opposite direction, and flows as a dilute solution 2 increased in temperature out of a dilute solution outlet nozzle a3 into a regenerator G.

On the other hand, as indicated by the dotted lines, a second, or concentrated, solution 3 from the regenerator G is introduced into the solution heat exchanger from a concentrated solution inlet nozzle b1, and passed through inter-plate passages bS in the second path and an opening b2 formed in the partition plate ST. Then, the concentrated solution 3 is passed through passages bS in the first path in an opposite direction, and flows as a concentrated solution 4 decreased in temperature out of a concentrated solution outlet nozzle b3 into the absorber A.

In FIGS. 1A through 1C, as described above, the flows of the dilute solution are indicated by the solid lines, and all the passages therefor are represented by the reference characters including the character "a". The flows of the concentrated solution are indicated by the dotted lines, and all the passages therefor are represented by the reference characters including the character "b". Heat is exchanged between the flow of the dilute solution and the flow of the concentrated solution.

There is provided a dilute solution extraction nozzle c1 communicating with the latter parts of the passages aS of the dilute solution in the first path, and a dilute solution supply nozzle c2 communicating with the passages bS at the inlet for the concentrated solution in the first path. A communication pipe R is provided as an external pipe between the dilute solution extraction nozzle c1 and the dilute solution supply nozzle c2. A portion of the dilute solution is introduced into the concentrated solution through the communication pipe R for preventing crystals from being formed in the vicinity of the concentrated solution outlet nozzle b3.

In the example shown in FIGS. 1A through 1C, an orifice $O_R$ is inserted in the communication pipe R for regulating the flow rate at which the dilute solution flows through the communication pipe R. However, the communication pipe R may have a manual valve or a solenoid valve (motor-operated valve) that is actuated based on a detected state (temperature, pressure, concentration, or the like) of an internal cycle.

Further, in the example shown in FIGS. 1A through 1C, the nozzle c1 is provided. However, the nozzle c1 may be dispensed with, and the communication pipe R may be disposed so as to be connected from the nozzle a1 directly to the nozzle c2.

Furthermore, in the example shown in FIGS. 1A through 1C, the solution heat exchanger H has a structure with two paths. However, the number of paths in the solution heat exchanger H is not limited to the illustrated example.

Figure 2A:
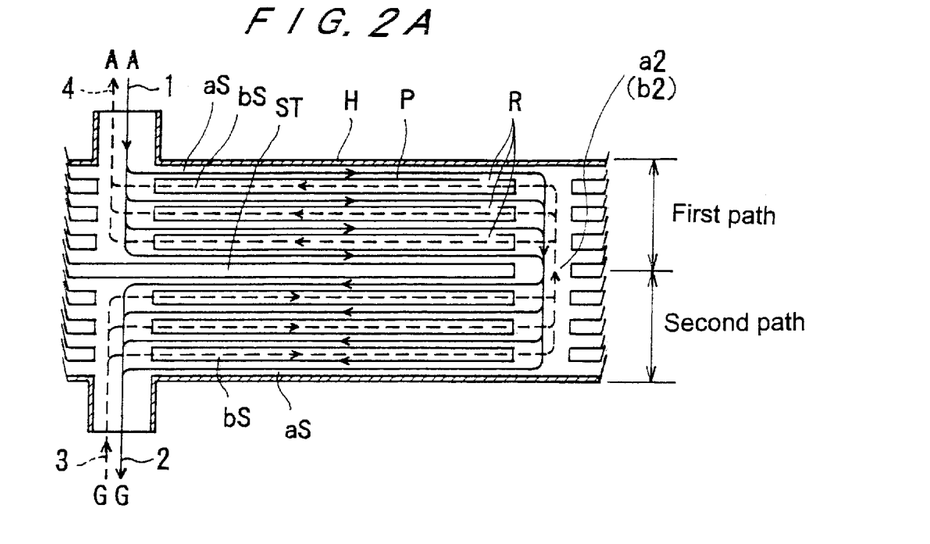
FIG. 2A is a cross-sectional front view of the solution heat exchanger.
Figure 2B:
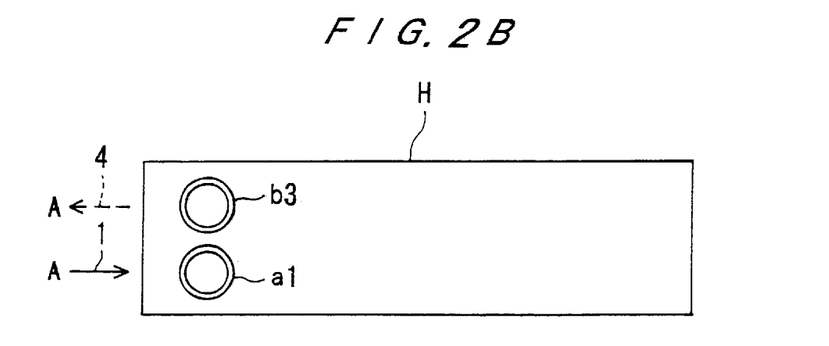
FIG. 2B is a plan view of the solution heat exchanger as viewed from above in FIG. 2A.
Figure 2C:
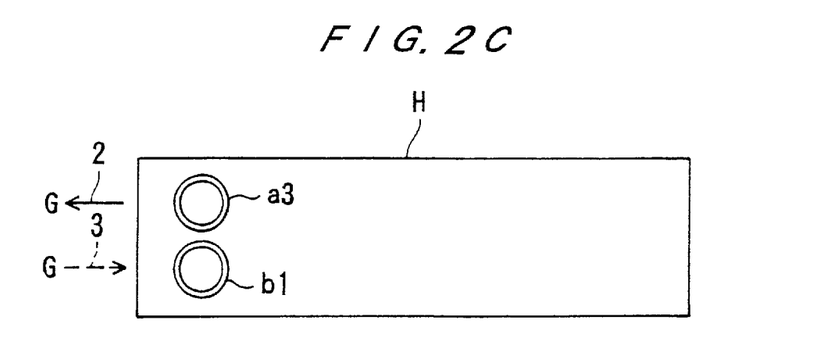
FIG. 2C is a plan view of the solution heat exchanger as viewed from below in FIG. 2A.

FIGS. 2A, 2B, and 2C are schematic views showing another example of a whole structure of a solution heat exchanger according to the first embodiment of the present invention. FIG. 2A is a cross-sectional front view of the solution heat exchanger, FIG. 2B is a plan view of the solution heat exchanger as viewed from above in FIG. 2A, and FIG. 2C is a plan view of the solution heat exchanger as viewed from below in FIG. 2A.

In FIGS. 2A through 2C, the flows of a dilute solution are indicated by the solid lines, and the flows of a concentrated solution are indicated by the dotted lines. Passages for the dilute solution are represented by the reference characters including the character "a", and passages for the concentrated solution are represented by the reference characters including the character "b", as with the example shown in FIGS. 1A through 1C.

The solution heat exchanger shown in FIGS. 2A through 2C has a structure similar to the solution heat exchanger shown in FIGS. 1A through 1C. However, the solution heat exchanger shown in FIGS. 2A through 2C differs from the solution heat exchanger shown in FIGS. 1A through 1C in that the communication pipe R as the external pipe is not provided, but a communication portion R is defined in internal plates P in direct communication between a passage aS and a passage bS. With this arrangement, since an external pipe is not required, the structure of the solution heat exchanger can be simplified.

Operation of the solution heat exchanger according to the present invention for preventing crystals from being formed will be described below.

Figure 3:
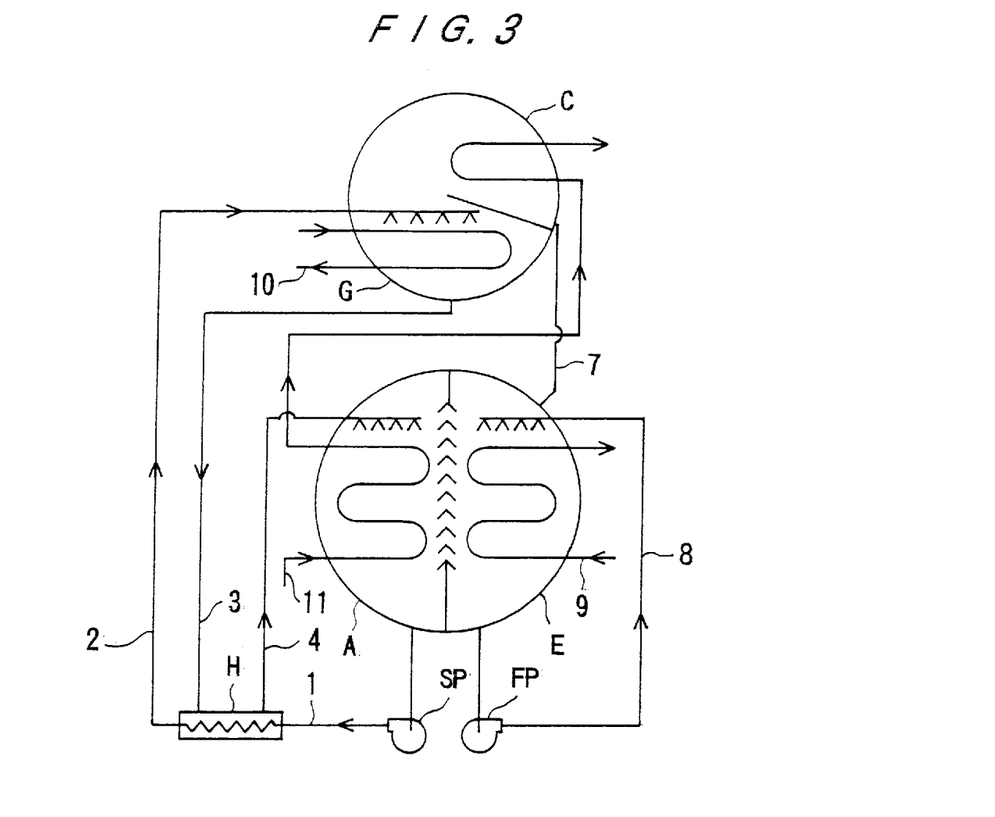
FIG. 3 is a schematic diagram showing a typical flow cycle of a conventional absorption refrigerating machine.

FIG. 3 shows a typical flow cycle of an absorption refrigerating machine.

In FIG. 3, the reference character A denotes an absorber, G a regenerator, C a condenser, E an evaporator, and H a solution heat exchanger. In a solution cycle, a dilute solution that has absorbed a refrigerant in the absorber A is passed through a passage 1 and a heated side of the heat exchanger H, and the diluted solution increased in temperature is then introduced into the regenerator G through a passage 2 by a solution pump SP. In the regenerator G, the dilute solution is heated by a heat source 10, and the refrigerant is evaporated, so that the dilute solution changes into a concentrated solution. The concentrated solution is passed through a passage 3 and a heating side of the heat exchanger H, and the concentrated solution decreased in temperature is then introduced through a passage 4 into the absorber A, where the concentrated solution absorbs the refrigerant to change into the dilute solution. Thus, the solution is circulated.

In a refrigerant cycle, the refrigerant evaporated in the regenerator G is cooled and condensed by cooling water 11 in the condenser C, and the condensed refrigerant liquid is introduced into the evaporator E through a passage 7. In the evaporator E, the refrigerant liquid is evaporated while being circulated through a passage 8 by a refrigerant pump FP. The refrigerant that has cooled chilled water 9 to be evaporated is absorbed into the concentrated solution in the absorber A, and then circulated as the dilute solution.

Figure 4A:
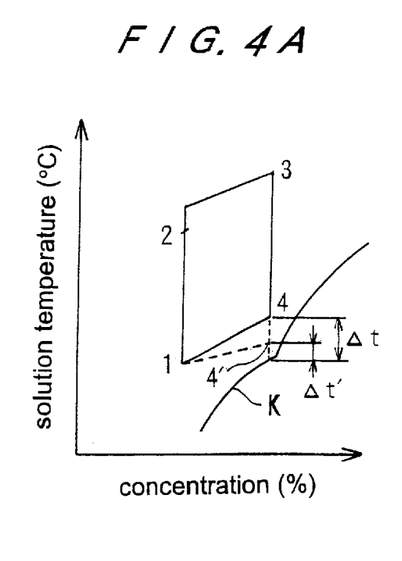
FIG. 4A is a schematic diagram showing a refrigerant cycle of solution cycles in FIG. 3.
Figure 4B:
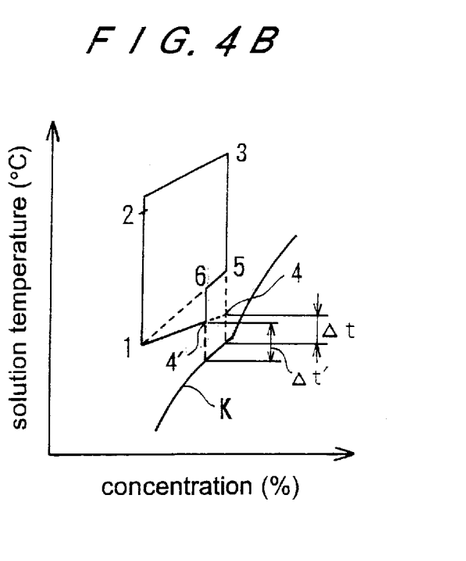
FIG. 4B is a cycle diagram in the case where the solution heat exchanger shown in FIGS. 1A through 1C, according to the present invention, is used.

FIG. 4A shows the solution cycle in FIG. 3, and FIG. 4B shows a cycle diagram in the case of the solution heat exchangers according to the present invention which are shown in FIGS. 1A through 1C and FIGS. 2A through 2C.

First, the conventional cycle diagram will be described below. In FIG. 4A, cycle points 1, 2, 3 and 4 correspond the passages 1 to 4 shown in FIG. 3, and indicate the temperatures and concentrations of the dilute solution and the concentrated solution at the inlet and outlet of the heat exchanger. The dilute solution is increased in temperature from the point 1 to the point 2 by heat exchange, further increased in temperature by the regenerator to evaporate the refrigerant, and concentrated to be a concentrated solution, which is decreased in temperature from the point 3 to the point 4 by heat exchange.

In FIGS. 4A and 4B, a crystallization line is represented by a line K, and the margin of the temperature with respect to the crystallization line K is represented by $\Delta t$.

In the cycle shown in FIG. 4A, as the efficiency of the heat exchanger is increased, the temperature at the point 2 rises, and the temperature at the point 4 falls as indicated by the dotted lines, so that the margin with respect to the crystallization line K is decreased from $\Delta t$ to $\Delta t'$. In the worst case, crystals are formed at the point 4.

In FIG. 4B, a portion of a first solution (dilute solution) begins to be communicated with a second solution (concentrated solution) at the point "5". A point "6" represents the concentration and temperature of the solution in which the first solution has been mixed with the second solution.

Even if the solutions at the points 1, 4 in FIG. 4A are mixed with each other, since the temperature and concentration at the point 4 prior to the mixing of the solutions are unknown, the effect of crystal prevention cannot be obtained. Therefore, it is desirable to locate the communication portion on the concentrated solution side at a position upstream of the point 4, i.e., closer to the point 3. The position of extracting the dilute solution to be mixed may be located between the points 1 and 2, rather than at the point 1.

Figure 5:
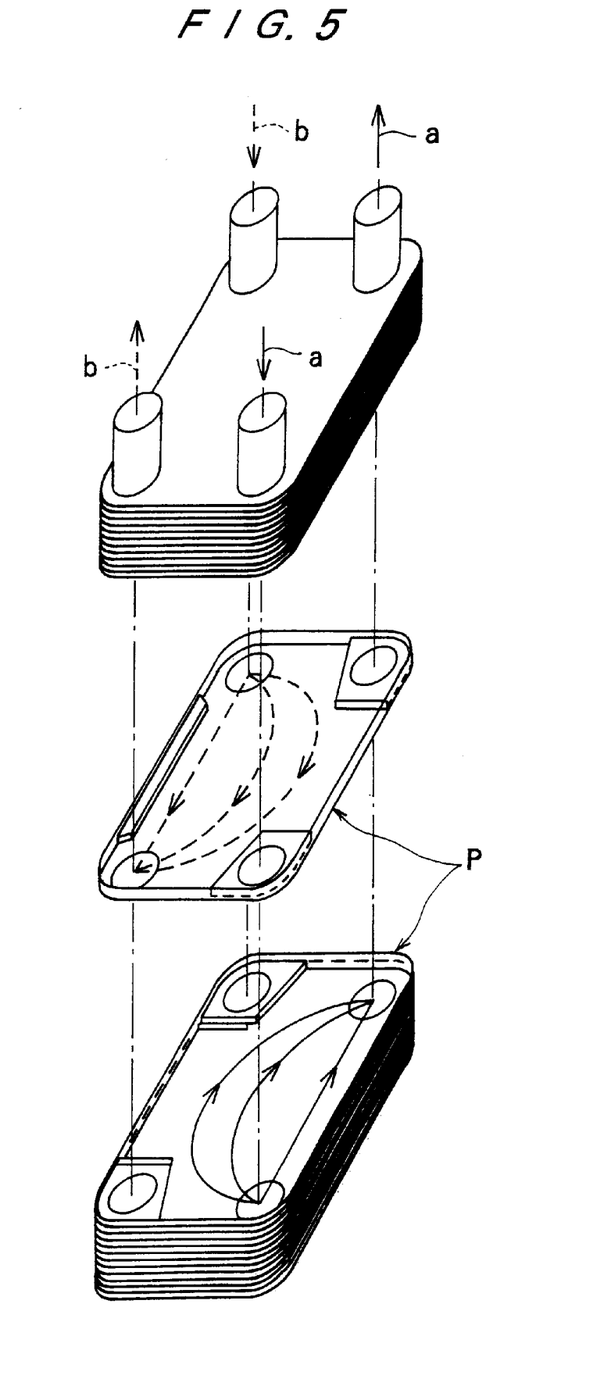
FIG. 5 is a schematic view explanatory of flows in a typical plate type heat exchanger.

FIG. 5 is a schematic view explanatory of flows in a typical plate type heat exchanger. As shown in FIG. 5, a low-temperature fluid a (indicated by the solid lines) and a high-temperature fluid b (indicated by the broken lines) flow alternately between a plurality of piled plates P, so that heat is exchanged between the plates.

Each of the plates P has four communicating holes defined therein as inlets and outlets for the fluids a, b.

Figure 6A:
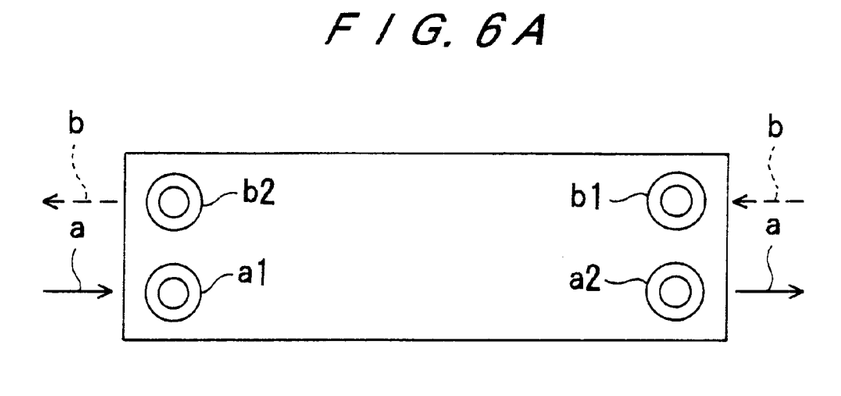
FIG. 6A is a plan view of the plate type heat exchanger.
Figure 6B:
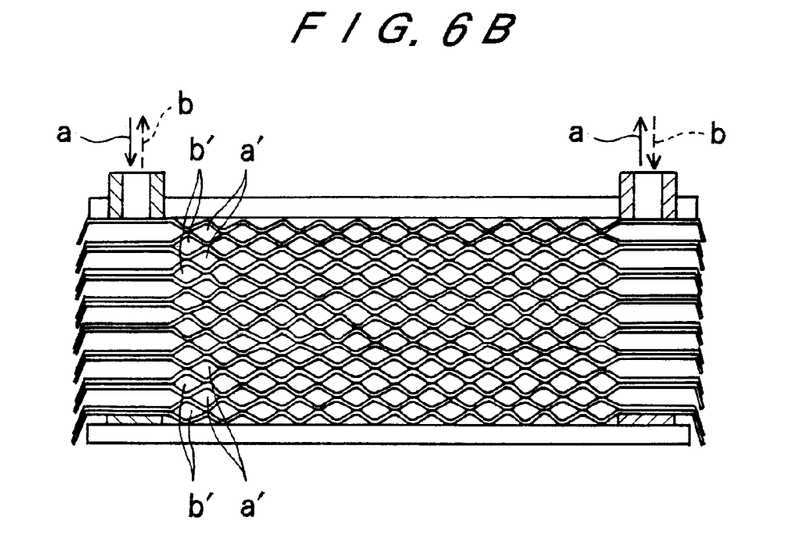
FIG. 6B is a cross-sectional side view of the plate type heat exchanger.

FIGS. 6A and 6B are schematic views showing a typical cross-sectional structure of the plate type heat exchanger shown in FIG. 5. FIG. 6A is a plan view of the plate type heat exchanger, and FIG. 6B is a cross-sectional side view of the plate type heat exchanger. FIG. 6B shows a cross section of an inlet nozzle and an outlet nozzle for the fluid a, which flows through passages a'.

The fluid a is introduced into the plate type heat exchanger from a nozzle a1, passed through the passages a' in the plate type heat exchanger, and flows out of a nozzle a2 provided on the opposite side. The outlet for the fluid a may be composed of a nozzle b1.

On the other hand, the fluid b is introduced into the plate type heat exchanger from the nozzle b1, passed through passages b' in the plate type heat exchanger, and flows out of a nozzle b2 provided on the opposite side. The outlet for the fluid b may be composed of the nozzle a1.

The plate type heat exchanger shown in FIGS. 5, 6A and 6B may be provided with a communication portion, to thus be used as a heat exchanger according to the present invention.

As described above, according to the first embodiment, crystals are prevented from being formed at the outlet for the concentrated solution. Even when the efficiency of the solution heat exchanger is greatly improved, the absorption refrigerating machine can stably be operated without crystallization. When the communication portion on the concentrated solution side is located upstream of a final stage of the passages for the concentrated solution, the solution heat exchanger is more effective to prevent crystals from being formed. With the communication portion disposed between adjacent plates in the plate type heat exchanger, the plate type heat exchanger has a compact structure having no external pipe.

A second embodiment of the present invention will be described below with reference to FIGS. 7 through 13.

Figure 7A:
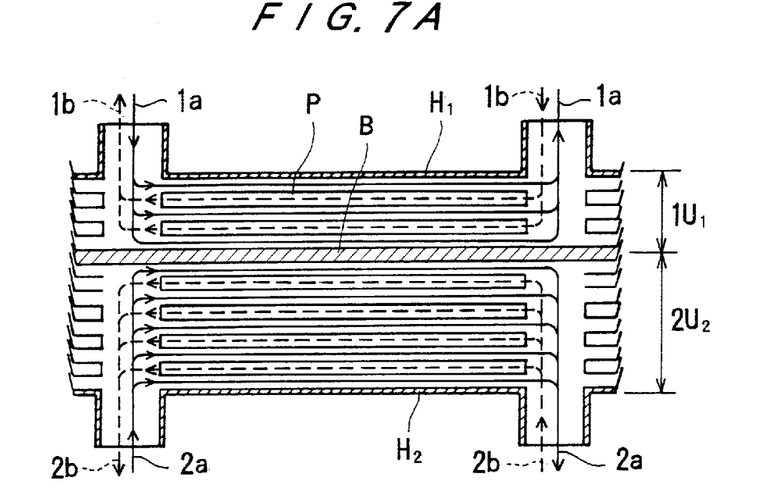
FIG. 7A is a cross-sectional front view of the plate type heat exchanger.
Figure 7B:
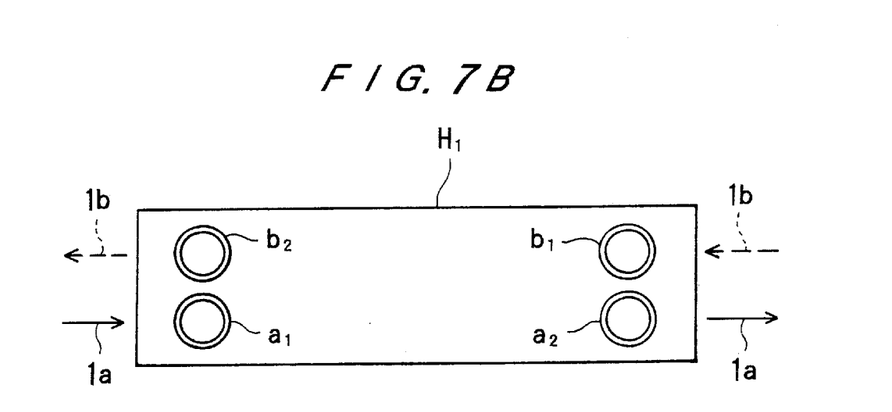
FIG. 7B is a plan view of the plate type heat exchanger as viewed from above in FIG. 7A.
Figure 7C:
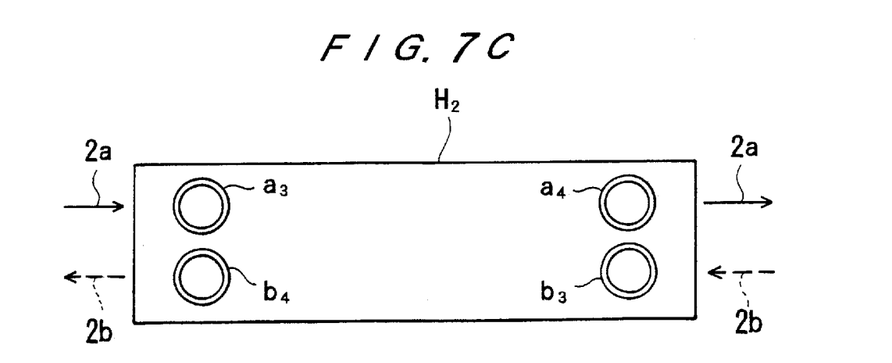
FIG. 7C is a plan view of the plate type heat exchanger as viewed from below in FIG. 7A.

FIGS. 7A, 7B, and 7C are schematic views showing an example of a whole structure of a plate type heat exchanger according to a second embodiment of the present invention. FIG. 7A is a cross-sectional front view of the plate type heat exchanger, FIG. 7B is a plan view of the plate type heat exchanger as viewed from above in FIG. 7A, and FIG. 7C is a plan view of the plate type heat exchanger as viewed from below in FIG. 7A.

In FIGS. 7A through 7C, the reference characters $H_1$, $H_2$ denote heat exchangers, P a plate, B a partition wall. The reference characters $a_1$ through $a_4$, and $b_1$ through $b_4$ denote inlet and outlet nozzles for heated and heating fluids, respectively, and the reference characters $1a$, $2a$, $1b$ and $2b$ denote the flows of the heated fluid and the heating fluid, respectively.

In the example shown in FIG. 7A, the plate type heat exchanger is divided into an upper unit $1U_1$ and a lower unit $2U_2$ by the partition wall B. The heat exchangers $H_1$, $H_2$ that are independent of each other are integrally combined with each other. If the pressure difference between the unit $1U_1$ and the unit $2U_2$ is small, then the partition wall B may comprise a closed plate P having a basic configuration that is exactly the same as the plates P in the heat exchangers $H_1$, $H_2$ and has no passage for allowing the fluids $1a$, $1b$ (and the fluids $2a$, $2b$) to flow therethrough. If the pressure difference between the unit $1U_1$ and the unit $2U_2$ is large, then the partition wall B may have a thickness required to provide a desired level of mechanical strength.

The partition wall may comprise a plurality of plates with an interior space therebetween hermetically sealed as a vacuum space to provide a thermally insulated vacuum layer. In this case, heat loss between the heat exchangers $H_1$, $H_2$ can be reduced. Further, if the heat exchanger has multiple paths, then a thermally insulated vacuum layer may be interposed between the paths.

The fluid $1a$ indicated by the solid lines in the unit $1U_1$ is introduced into the unit $1U_1$ from a nozzle $a_1$, and flows out of a nozzle $a_2$. The fluid $1b$ indicated by the broken lines in the unit $1U_1$ is introduced into the unit $1U_1$ from a nozzle $b_1$, and flows out of a nozzle $b_2$. The fluid $1a$ and the fluid $1b$ flow alternately through the passages for exchanging heat with each other.

The fluid $2a$ indicated by the solid lines in the unit $2U_2$ is introduced into the unit $2U_2$ from a nozzle $a_3$, flows out of a nozzle $a_4$. The fluid $2b$ indicated by the broken lines in the unit $2U_2$ is introduced into the unit $2U_2$ from a nozzle $b_3$, and flows out of a nozzle $b_4$. The fluid $2a$ and the fluid $2b$ flow alternately through the passages for exchanging heat with each other.

The example shown in FIGS. 7A through 7C comprises two integrated heat exchangers that are independent of each other.

Figure 8A:
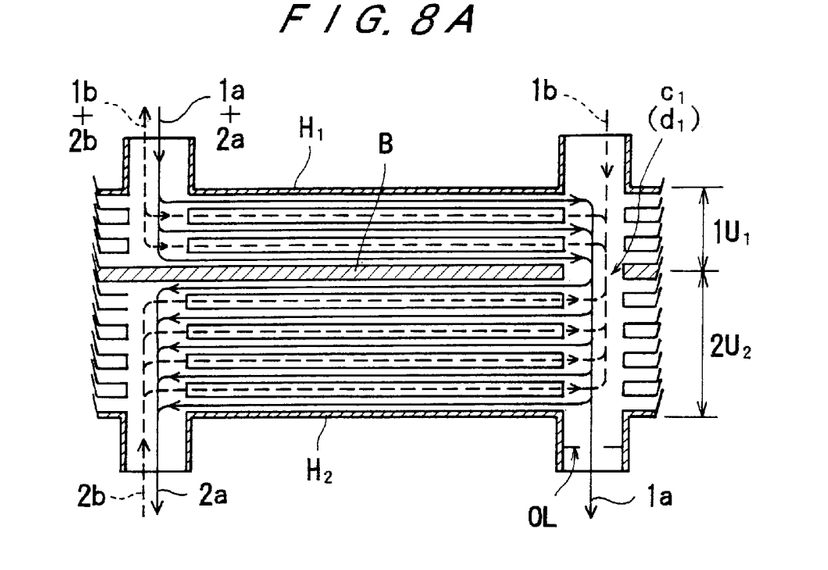
FIG. 8A is a cross-sectional front view of the plate type heat exchanger.
Figure 8B:
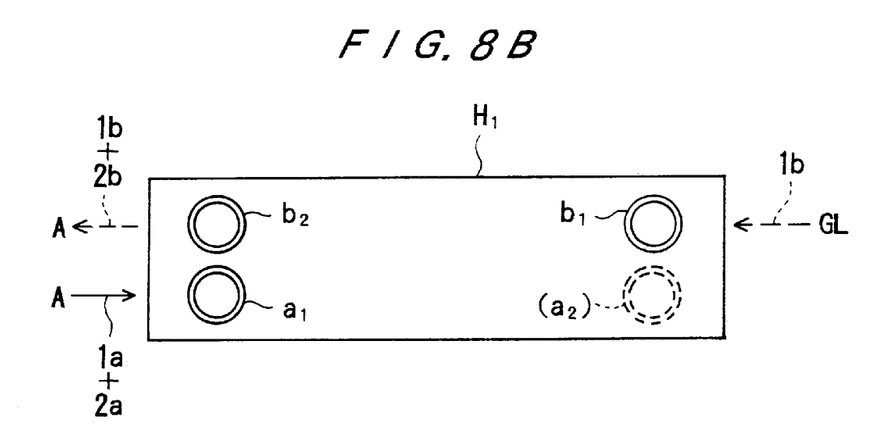
FIG. 8B is a plan view of the plate type heat exchanger as viewed from above in FIG. 8A.
Figure 8C:
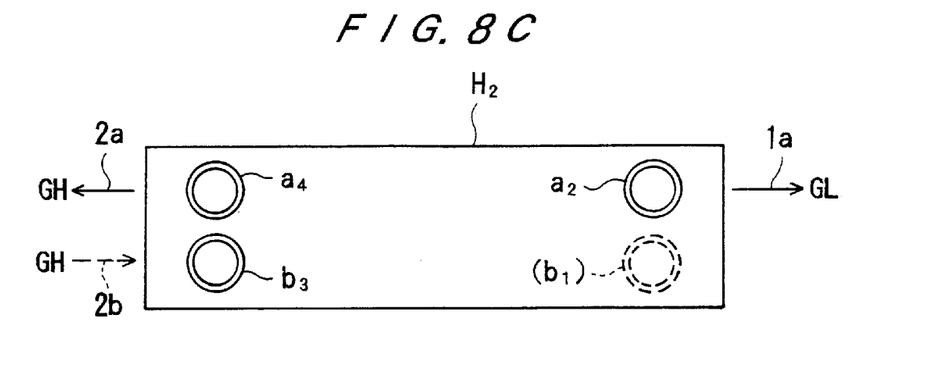
FIG. 8C is a plan view of the plate type heat exchanger as viewed from below in FIG. 8A.

FIGS. 8A, 8B, and 8C are schematic views showing another example of a whole structure of a plate type heat exchanger according to the second embodiment of the present invention. FIG. 8A is a cross-sectional front view of the plate type heat exchanger, FIG. 8B is a plan view of the plate type heat exchanger as viewed from above in FIG. 8A, and FIG. 8C is a plan view of the plate type heat exchanger as viewed from below in FIG. 8A.

In FIGS. 8A through 8C, the plate type heat exchanger is divided into an upper unit $1U_1$ and a lower unit $2U_2$ by a partition wall B having passages $c_1$, $d_1$.

The unit $1U_1$ has three nozzles $a_1$, $b_1$ and $b_2$, and the unit $2U_2$ has three nozzles $a_2$, $b_3$ and $a_4$. The partition wall B has two passages defined therein at the position $c_1$ corresponding to the nozzle $a_2$ and at the position $d_1$ corresponding to the nozzle $b_1$, and the passages defined in the partition wall B communicate between the units.

The application of the plate type heat exchanger shown in FIGS. 8A through 8C to a solution heat exchanger for an absorption refrigerating machine will be described below. A dilute solution $1a+2a$ from an absorber is introduced into the unit $1U_1$ from the nozzle $a_1$, and passed between the plates in the unit $1U_1$ (low-temperature solution heat exchanger). Then, the dilute solution is introduced from the communication passage $c_1$ defined in the partition wall B into the unit $2U_2$ (high-temperature solution heat exchanger). A portion $2a$ of the dilute solution is passed between the plates in the unit $2U_2$, and flows out of the nozzle $a_4$ into a high-temperature regenerator. A portion $1a$ of the dilute solution introduced into the unit $2U_2$ from the communication passage $c_1$ flows out of the nozzle $a_2$ into a low-temperature regenerator.

A solution $2b$ returned from the high-temperature regenerator is introduced into the unit $2U_2$ from the nozzle $b_3$, and passed between the plates in the unit $2U_2$. Then, the solution $2b$ is introduced into the unit $1U_1$ through the communication passage $d_1$ defined in the partition wall B. The solution $2b$ is joined to a solution $1b$ returned from the low-temperature regenerator, which is introduced into the unit $1U_1$ from the nozzle $b_1$, and passed between the plates in the unit $1U_1$. Then, the solution flows out of the nozzle $b_2$ and is returned to the absorber.

Thus, the solution heat exchanger for an absorption refrigerating machine has a compact structure with a small number of pipes, and can perform heat exchange between the low-temperature dilute solution $1a+2a$ and the high-temperature concentrated solution (the solution $1b$ returned from the low-temperature regenerator or the solution $2b$ returned from the high-temperature regenerator).

With the arrangement shown in FIGS. 8A through 8C, the heat exchanger is required to have only six pipes. However, in the case where the conventional heat exchangers are independently arranged, the heat exchangers are required to have eight pipes.

For easy understanding, both of the low-temperature solution heat exchanger and the high-temperature solution heat exchanger have been described as having a passage structure with one path. However, they may have a passage structure with a plurality of paths.

In order to regulate a flow rate distribution (between the low-temperature regenerator and the high-temperature regenerator) of the dilute solution at the inlet of the unit $2U_2$, a flow rate regulating mechanism such as an orifice OL may be provided at the nozzle $a_2$.

In FIGS. 8A through 8C, the reference characters including the characters "a" and "c" represent the flows of the dilute solution and the nozzles, and the reference characters including the characters "b" and "d" represent the flows of the concentrated solution and the nozzles. The same is true for an arrangement shown in FIGS. 9A through 9C.

Figure 9A:
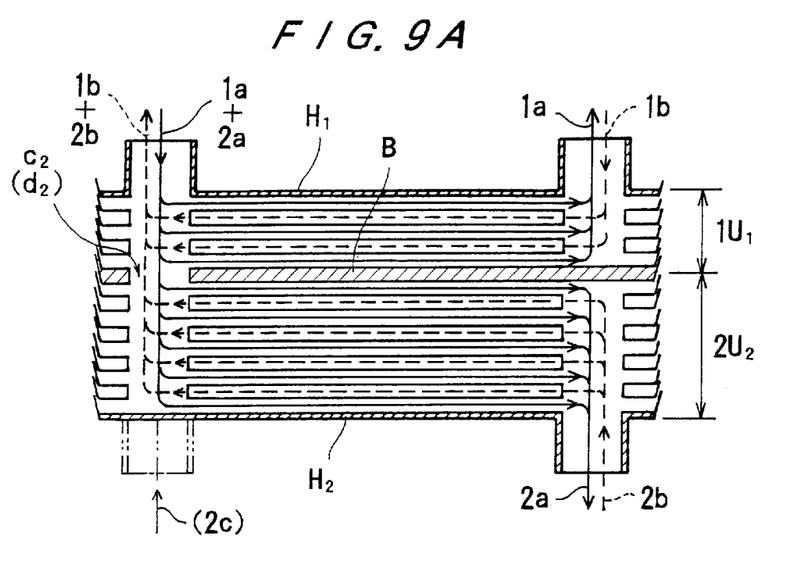
FIG. 9A is a cross-sectional front view of the plate type heat exchanger.
Figure 9B:
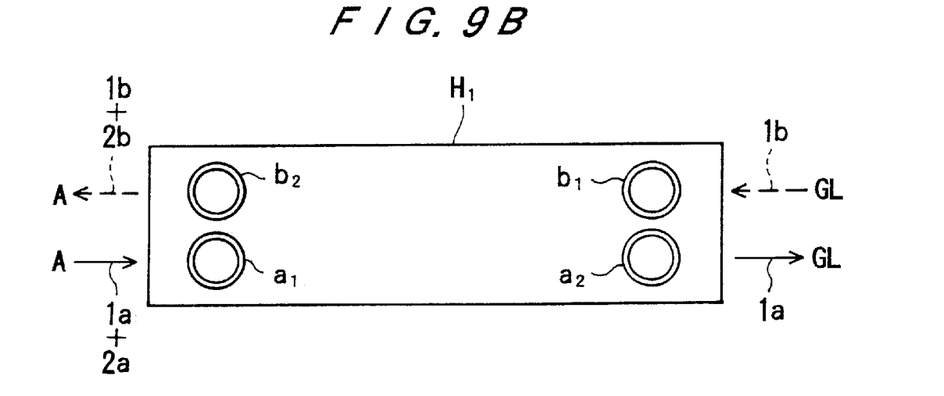
FIG. 9B is a plan view of the plate type heat exchanger as viewed from above in FIG. 9A.
Figure 9C:
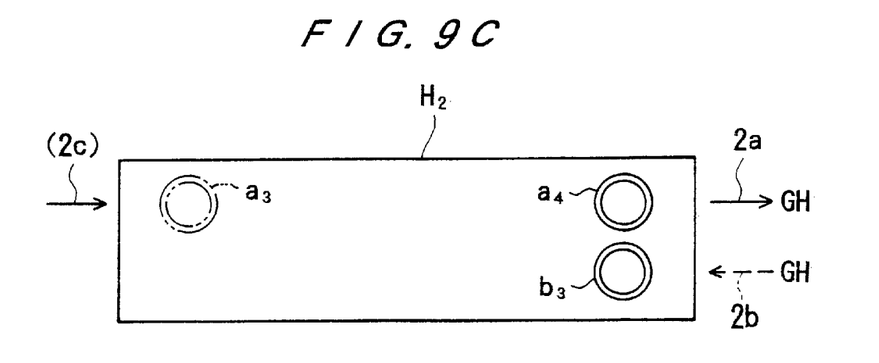
FIG. 9C is a plan view of the plate type heat exchanger as viewed from below in FIG. 9A.

FIGS. 9A, 9B, and 9C are schematic views showing still another example of a whole structure of a plate type heat exchanger according to the second embodiment of the present invention. FIG. 9A is a cross-sectional front view of the plate type heat exchanger, FIG. 9B is a plan view of the plate type heat exchanger as viewed from above in FIG. 9A, and FIG. 9C is a plan view of the plate type heat exchanger as viewed from below in FIG. 9A.

In FIGS. 9A through 9C, the plate type heat exchanger is divided into an upper unit $1U_1$ and a lower unit $2U_2$ by a partition wall B having passages $c_2$, $d_2$.

The unit $1U_1$ has four nozzles $a_1$, $a_2$, $b_1$ and $b_2$, and the unit $2U_2$ has two nozzles $b_3$, $a_4$. The partition wall B has two passages defined therein at the position $c_2$ corresponding to the nozzle $a_1$ and at the position $d_2$ corresponding to the nozzle $b_2$, and the passages defined in the partition wall B communicate between the units.

The application of the plate type heat exchanger shown in FIGS. 9A through 9C to a solution heat exchanger for an absorption refrigerating machine will be described below. A dilute solution $1a+2a$ from an absorber is introduced from the nozzle $a_1$ into the unit $1U_1$ (low-temperature solution heat exchanger). A portion of the dilute solution is passed between the plates in the unit $1U_1$, and flows out of the nozzle $a_2$ into a low-temperature regenerator.

A portion of the dilute solution $1a+2a$ that has been introduced into the unit $1U_1$ is passed through the communication passage $c_2$ defined in the partition wall B, and introduced into the unit $2U_2$. Then, the solution is passed between the plates in the unit $2U_2$, and flows out of the nozzle $a_4$ into a high-temperature regenerator.

A solution $2b$ returned from the high-temperature regenerator is introduced into the unit $2U_2$ from the nozzle $b_3$, and passed between the plates in the unit $2U_2$. Then, the solution is passed through the communication passage $d_2$ defined in the partition wall B, and introduced into the unit $1U_1$. The solution $2b$ is joined to a solution $1b$ returned from the low-temperature regenerator, which is introduced into the unit $1U_1$ from the nozzle $b_1$. Then, the solution flows out of the nozzle $b_2$, and is returned to the absorber.

A nozzle $a_3$ indicated by the chain lines may be added to the unit $2U_2$ to introduce a solution $2c$ from another system into the unit $2U_2$.

Thus, the solution heat exchanger for an absorption refrigerating machine has a compact structure with a small number of pipes, and can perform heat exchange between the low-temperature dilute solution $1a+2a$ and the high-temperature concentrated solution (the solution $1b$ returned from the low-temperature regenerator or the solution $2b$ returned from the high-temperature regenerator).

With the arrangement shown in FIGS. 9A through 9C, the heat exchangers are required to have only six pipes. However, in the case where the conventional heat exchangers are independently arranged, the heat exchangers are required to have eight pipes.

In FIGS. 9A through 9C, for easy understanding, both of the low-temperature solution heat exchanger and the high-temperature solution heat exchanger have been described as having a passage structure with one path. However, they may have a passage structure with a plurality of paths.

In order to regulate a flow rate distribution (between the low-temperature regenerator $1a$ and the high-temperature regenerator $2a$) of the dilute solution $1a+2a$ at the inlet of the unit $1U_1$, a flow rate regulating mechanism (not shown) such as an orifice may be provided at the nozzle $a_2$, as with the arrangement shown in FIGS. 8A through 8C.

Figure 10:
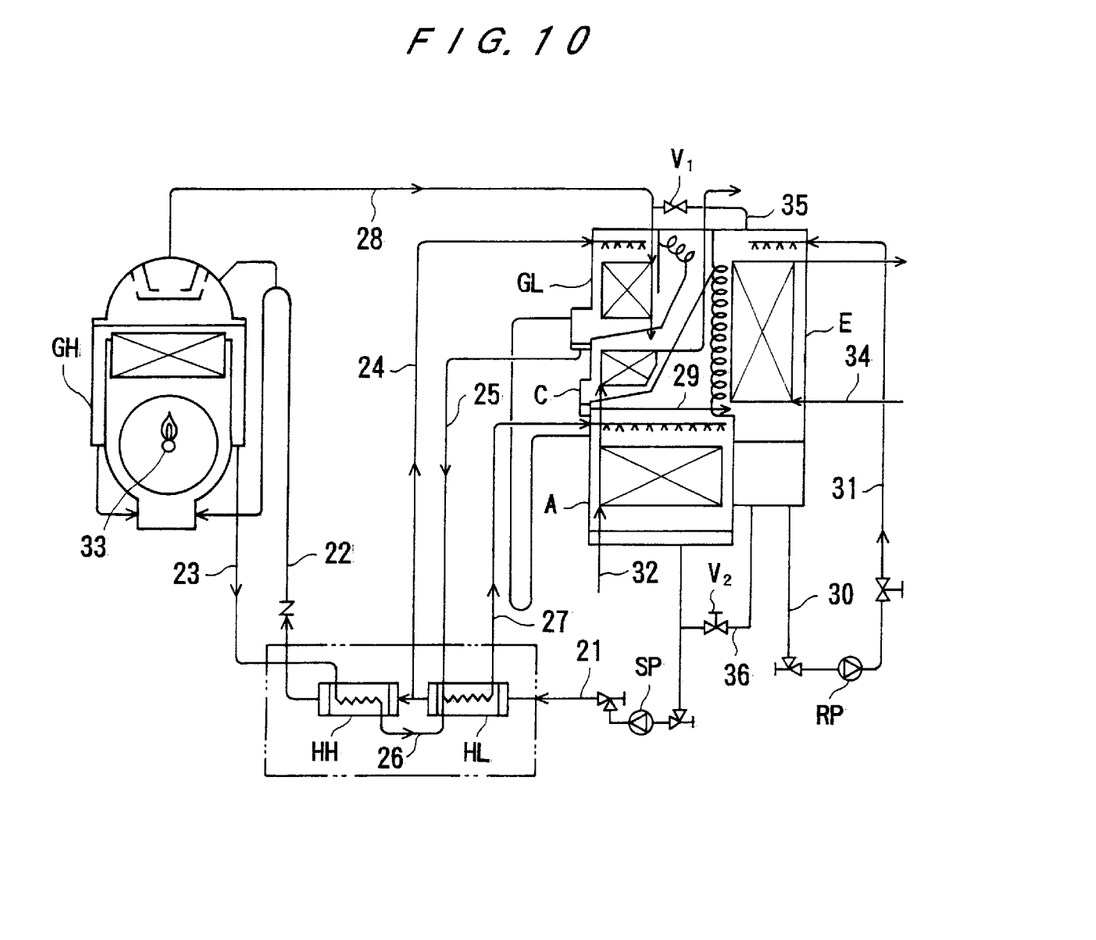
FIG. 10 is a schematic diagram showing flows in a double effect absorption chiller-heater to which the second embodiment of the present invention is applied.

FIG. 10 is a schematic diagram showing flows in a double effect absorption chiller-heater to which the present invention is applied.

In FIG. 10, the reference character A denotes an absorber, GL a low-temperature regenerator, GH a high-temperature regenerator, C a condenser, E an evaporator, HL a low-temperature heat exchanger, HH a high-temperature heat exchanger, SP a solution pump, and RP a refrigerant pump. The reference numerals 21 to 27 denote solution passages, 28 to 31 refrigerant passages, and 32 a cooling water passage.

In the cooling operation with this apparatus, a dilute solution that has absorbed a refrigerant is passed from the absorber A through a heated side of the low-temperature heat exchanger HL by the solution pump SP. A portion of the dilute solution is passed through a heated side of the high-temperature heat exchanger HH, and introduced through the passage 22 into the high-temperature regenerator GH. In the high-temperature regenerator GH, the dilute solution is heated by a heat source 33 to evaporate the refrigerant, and concentrated. The concentrated solution is introduced through the passage 23 into the high-temperature heat exchanger HH, where heat exchange is performed. Then, the concentrated solution is joined to a concentrated solution from the low-temperature regenerator GL, and passed through the low-temperature heat exchanger HL. Then, the concentrated solution is introduced into the absorber A through the passage 27.

The dilute solution that has been passed through the low-temperature heat exchanger HL is branched by the passage 24. The rest of the dilute solution that flows into the high-temperature regenerator GH is introduced into the low-temperature regenerator GL. In the low-temperature regenerator GL, the dilute solution is heated and concentrated by the refrigerant vapor from the high-temperature regenerator GH, and then joined to the concentrated solution from the high-temperature regenerator GH through the passage 25. The joined solution is passed through a heating side of the low-temperature heat exchanger HL, and is introduced through the passage 27 into the absorber A.

The refrigerant vapor evaporated in the high-temperature regenerator GH is passed through the refrigerant passage 28, and used as a heat source for the low-temperature regenerator GL. Then, the refrigerant is introduced as a refrigerant liquid into the condenser C. In the condenser C, the refrigerant vapor from the low-temperature regenerator GL is cooled and condensed by the cooling water 32. The condensed refrigerant liquid is introduced through the passage 29 into the evaporator E. In the evaporator E, the refrigerant which is circulated by the refrigerant pump RP through the passages 30, 31 is evaporated, and heat of evaporation is removed from chilled water 34 as a load to cool the chilled water 34, which is used for cooling.

The evaporated refrigerant is absorbed into the concentrated solution in the absorber A, so that the concentrated solution changes into a dilute solution. Thus, the solution is circulated in a cycle by the solution pump SP.

In FIG. 10, bypass pipes 35, 36 serve to use the absorption chiller-heater for heating. In the heating operation, cooling/heating switching valves $V_1$, $V_2$ are opened to introduce the vapor from the high-temperature regenerator into an A/E (absorber/evaporator) shell, where hot water 34 flowing through evaporator tubes is heated. In the A/E shell, the refrigerant vapor is condensed into a drain (refrigerant liquid). The refrigerant liquid is passed through the valve $V_2$, and returned to the dilute solution circulating system, so that the hot water can be used for heating.

In the absorption chiller-heater shown in FIG. 10, the plate type heat exchanger according to the present invention is used as the solution heat exchangers (the low-temperature heat exchanger HL and the high-temperature heat exchanger HH). The absorption chiller-heater shown in FIG. 10 has branched flows such that the dilute solution that has flowed out of the low-temperature heat exchanger HL is branched to flow into the low-temperature regenerator GL and the high-temperature heat exchanger HH. The plate type heat exchanger shown in FIGS. 8A through 8C can be applied to the absorption chiller-heater shown in FIG. 10

When a comparison is made between FIGS. 8A through 8C and FIG. 10, the heat exchangers HL, HH shown in FIG. 10 correspond to the units $H_1$, $H_2$ shown in FIGS. 8A through 8C, the passages 21, 22, 24 shown in FIG. 10 the nozzles $a_1$, $a_4$, $a_2$ shown in FIGS. 8A through 8C, and the passages 23, 25, 26 and 27 shown in FIG. 10 the nozzles $b_3$, $b_1$, $d_1$ and $b_2$ shown in FIGS. 8A through 8C.

Figure 11A:
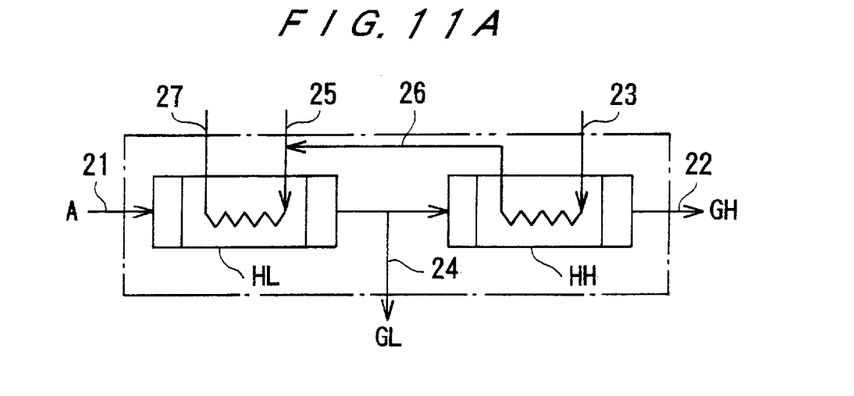
FIGS. 11A through 11C are schematic diagrams explanatory of various layout and solution flow types of solution heat exchangers (low-temperature and high-temperature heat exchangers) and an exhaust-heat-recovery heat exchanger.
Figure 11B:
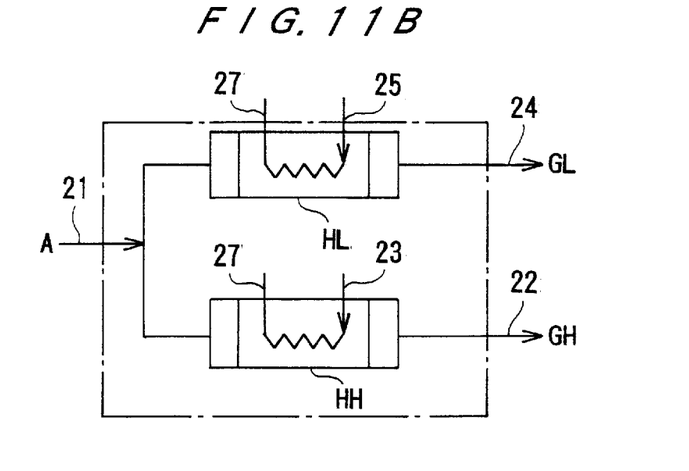
Figure 11C:
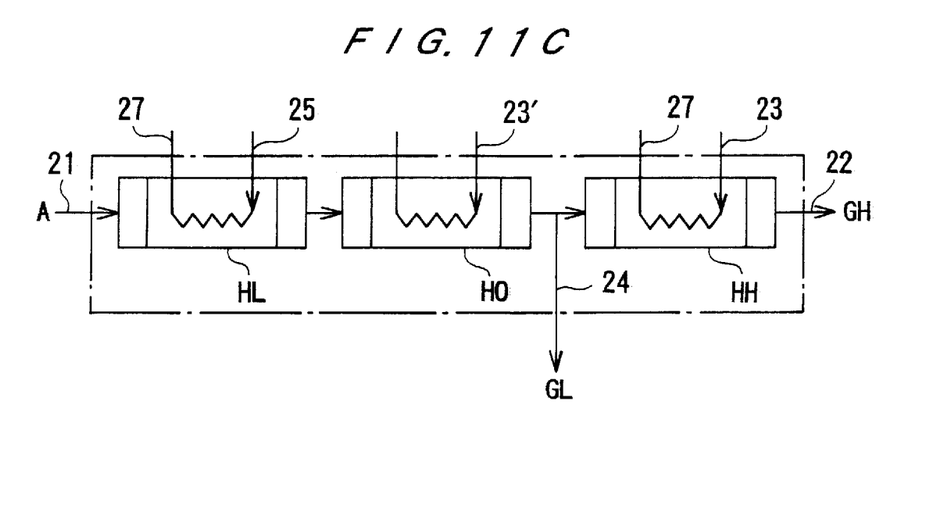

FIGS. 11A through 11C are schematic diagrams explanatory of various layout and solution flow types of solution heat exchangers (low-temperature and high-temperature heat exchangers) and an exhaust-heat-recovery heat exchanger. According to the present invention, components enclosed by the dashed line are integrally combined into a plate type heat exchanger.

FIG. 11A shows a case where a low-temperature solution heat exchanger HL and a high-temperature solution heat exchanger HH are arranged in series with each other. A dilute solution that has flowed out of the low-temperature solution heat exchanger HL is branched to flow to the low-temperature regenerator GL and the high-temperature solution heat exchanger HH. The branched flows are specifically exemplified by the plate type heat exchanger shown in FIGS. 8A through 8C.

FIG. 11B shows a case where a low-temperature solution heat exchanger HL and a high-temperature solution heat exchanger HH are arranged in parallel with each other. A dilute solution flows in parallel through both of the low-temperature solution heat exchanger HL and the high-temperature solution heat exchanger HH. The parallel flows are specifically exemplified by the plate type heat exchanger shown in FIGS. 9A through 9C.

FIG. 11C shows a case where a low-temperature solution heat exchanger HL, an exhaust-heat-recovery heat exchanger HO, and a high-temperature solution heat exchanger HH are arranged in series with each other. A dilute solution that has flowed out of the exhaust-heat-recovery heat exchanger HO is branched to flow to the low-temperature regenerator GL and the high-temperature solution heat exchanger HH, and thus the branched flows are formed.

The exhaust-heat-recovery heat exchanger HO is generic name of a drain heat exchanger for recovering heat from a vapor drain produced when a vapor is used as a heat source, and a heat exchanger for recovering heat for a refrigerating cycle from hot water that is recovered from engines and various exhaust heat, and the like.

Figure 12:
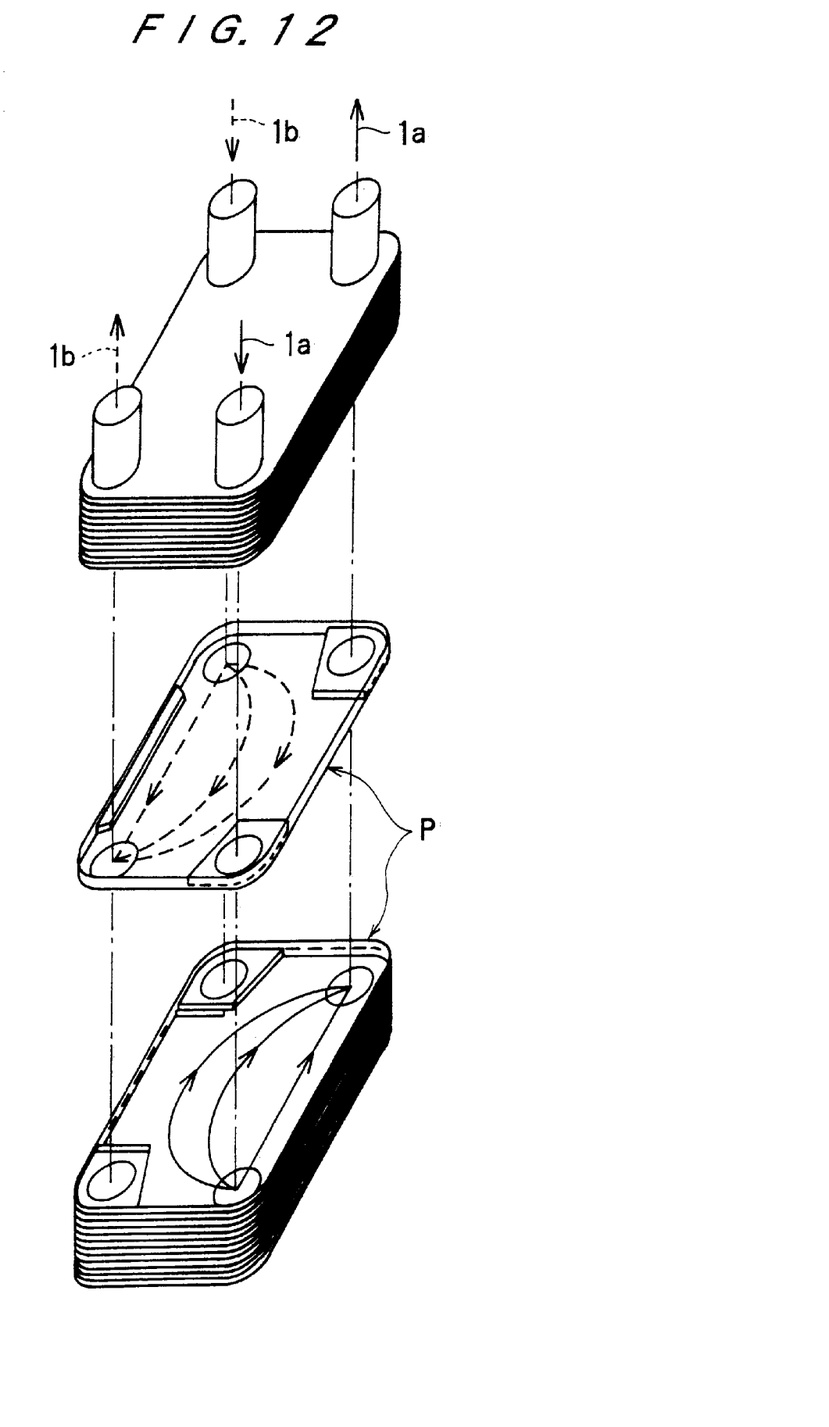
FIG. 12 is a schematic view explanatory of flows in a plate type heat exchanger.

FIG. 12 is a schematic view explanatory of flows in a plate type heat exchanger, and corresponds to FIG. 5.

As shown in FIG. 12, a low-temperature fluid $1a$ (indicated by the solid lines) and a high-temperature fluid $1b$ (indicated by the broken lines) flow alternately between a plurality of plied plates P for exchanging heat between the plates. Each of the plates P has four communicating holes defined therein as inlets and outlets for the fluids $1a$, $1b$.

Figure 13A:
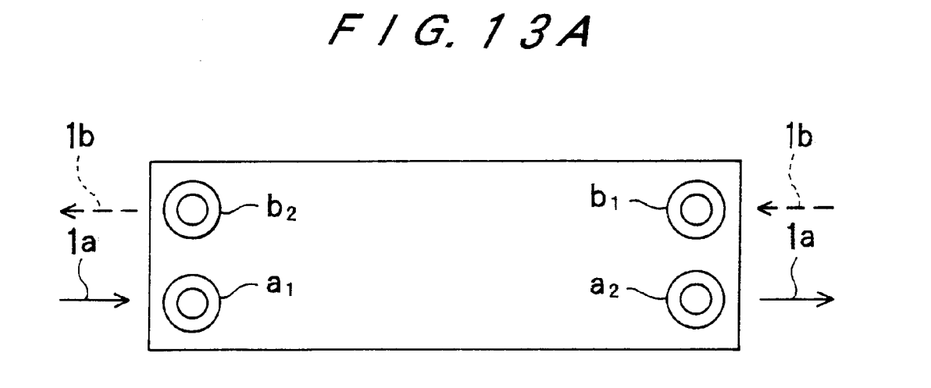
FIGS. 13A and 13B are schematic views showing a cross-sectional structure of the plate type heat exchanger shown in FIG. 12.
Figure 13B:
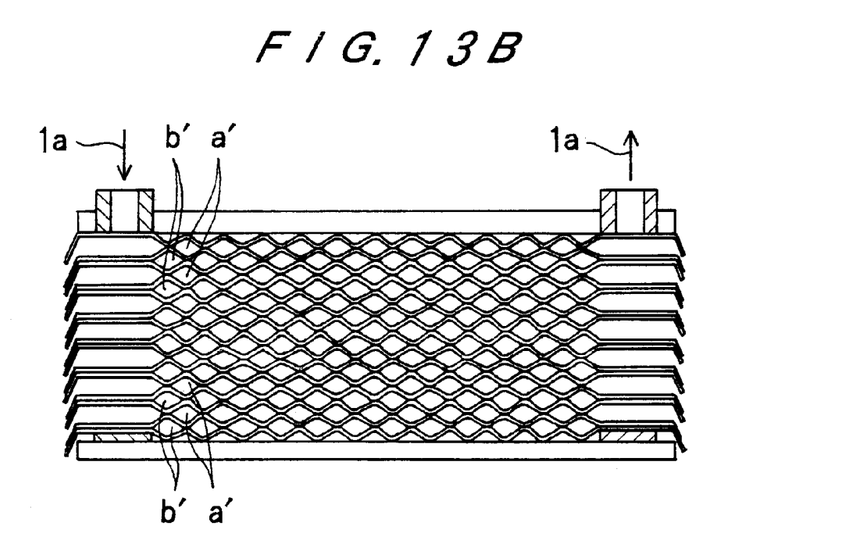

FIGS. 13A and 13B are schematic views showing a cross-sectional structure of the plate type heat exchanger shown in FIG. 12, and correspond to FIGS. 6A and 6B. FIG. 13A is a plan view of the plate type heat exchanger, and FIG. 13B is a cross-sectional side view of the plate type heat exchanger.

FIG. 13B shows a cross section of an inlet nozzle and an outlet nozzle for the fluid $1a$, which flows through passages a'.

The fluid $1a$ is introduced into the plate type heat exchanger from a nozzle $a_1$, passed through the passages in the plate type heat exchanger, and flows out of a nozzle $a_2$ provided on the opposite side. The outlet for the fluid $1a$ may be composed of a nozzle $b_1$.

On the other hand, the fluid $1b$ is introduced into the plate type heat exchanger from the nozzle $b_1$, passed through passages b' in the plate type heat exchanger, and flows out of a nozzle $b_2$ provided on the opposite side. The outlet for the fluid $1b$ may be composed of the nozzle $a_1$.

The plate type heat exchanger shown in FIGS. 12, 13A and 13B may be divided into a plurality of units by a partition wall, to thus be used as a heat exchanger according to the present invention.

According to the second embodiment of the present invention, the following effects can be obtained.

(1) Since the solution heat exchanger comprises a plate type heat exchanger, the amount of the solution used can be reduced, and the solution heat exchanger can be mass-produced at low cost.

(2) If a plurality of solution heat exchangers are integrally combined with each other through the use of a partition wall, highly sophisticated functions can be obtained, and the piping can be simplified. Further, reduction in size and weight can be achieved.

(3) Depending on the function and purpose of the heat exchanger, the structure of the partition wall may be changed, so that a free passage structure (absorption cycle) can be achieved. Specifically, the heat exchanger can cope with solution flows including branched flows, parallel flows, series flows, or the like, through the passage structures formed by the partition wall.

(4) The partition wall may have a structure similar to that of a plate constituting a plate type heat exchanger, with only its passage structure changed. Therefore, the heat exchanger can be mass-produced at low cost.

Industrial Applicability

The present invention employs a plate type heat exchanger for exchanging heat between two fluids flowing alternately between piled plates. The present invention can be used as a plate type heat exchanger for an absorption refrigerating machine.

What is claimed is:

1. A solution heat exchanger used for performing heat exchange between a first solution and a second solution in a solution passage of an absorption refrigerating machine, characterized in that said solution heat exchanger comprises:
   a plate type heat exchanger containing parallel passages operative to conduct said first and second solutions through alternate parallel passages in heat transfer relation with respect to each other, said parallel passages including:
      a first passage extending through said heat exchanger between a first pair of apertures, said first pair of apertures located at the exterior of said heat exchanger; and
      a second passage extending through said heat exchanger between a second pair of apertures, said second pair of apertures also located at the exterior of said heat exchanger; and
   a communication portion communicating between said first passage and said second passage.

2. A solution heat exchanger according to claim 1, including a plurality of heat transfer stages wherein said communication portion in said second solution passage is located upstream of a final stage of said second solution passage.

3. A solution heat exchanger according to either claim 1 or 2, wherein said communication portion is defined by an opening disposed between adjacent plates to communicate adjacent passages in said plate type heat exchanger.

4. A solution heat exchanger used for performing heat exchange between a dilute solution and a concentrated solution in a solution passage of an absorption refrigerating machine, characterized in that said solution heat exchanger comprises:
   a plate type heat exchanger containing parallel passages operative to conduct said dilute and concentrated solutions through alternate parallel passages in heat transfer relation with respect to each other, said parallel passages including:
      a first passage extending through said heat exchanger between a first pair of apertures, said first pair of apertures located at the exterior of said heat exchanger; and
      a second passage extending through said heat exchanger between a second pair of apertures, said second pair of apertures also located at the exterior of said heat exchanger; and
   a communication portion communicating between said first passage and said second passage.

5. A solution heat exchanger according to claim 1, including a plurality of heat transfer stages wherein said communication portion in said concentrated solution passage is located upstream of a final stage of said concentrated solution passage.

6. A solution heat exchanger according to either claim 1 or 2, wherein said communication portion is defined by an opening disposed between adjacent plates to communicate adjacent passages in said plate type heat exchanger.

* * * * *